US011315458B2

(12) United States Patent
Seo et al.

(10) Patent No.: US 11,315,458 B2
(45) Date of Patent: Apr. 26, 2022

(54) DISPLAY APPARATUS AND METHOD FOR CONTROLLING THEREOF

(71) Applicant: SAMSUNG ELECTRONICS CO., LTD., Suwon-si (KR)

(72) Inventors: Hoseong Seo, Suwon-si (KR); Battushig Ganbold, Suwon-si (KR); Seungik Kim, Suwon-si (KR); Taehyoung Kim, Suwon-si (KR); Hojin Byun, Suwon-si (KR); Cheolwu Oh, Suwon-si (KR); Kwansoo Lee, Suwon-si (KR); Jonggyu Lee, Suwon-si (KR); Jaewook Han, Suwon-si (KR); Minhyeong Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/074,109

(22) Filed: Oct. 19, 2020

(65) Prior Publication Data
US 2021/0142708 A1 May 13, 2021

(30) Foreign Application Priority Data

Nov. 11, 2019 (KR) .................. 10-2019-0143699

(51) Int. Cl.
*G09G 3/06* (2006.01)
*G06F 3/16* (2006.01)
*G09G 5/02* (2006.01)

(52) U.S. Cl.
CPC .............. *G09G 3/06* (2013.01); *G06F 3/16* (2013.01); *G09G 5/02* (2013.01); *G09G 2320/0666* (2013.01); *G09G 2370/04* (2013.01)

(58) Field of Classification Search
CPC .. G09G 3/06; G09G 3/34; G09G 5/02; G09G 2320/0666; G09G 2370/04; G06F 3/16;
(Continued)

(56) References Cited

U.S. PATENT DOCUMENTS 3,163,077 A * 12/1964 Shank .................... A63J 17/00
84/464 R
3,307,443 A * 3/1967 Shallenberger ......... G09F 19/12
84/464 R
(Continued)

FOREIGN PATENT DOCUMENTS

CN 109767690 A 5/2019
EP 1 379 082 B1 1/2004
(Continued)

OTHER PUBLICATIONS

International Search Report (PCT/ISA/210) dated Jan. 15, 2021 issued by the International Searching Authority in International Application No. PCT/KR2020/013914.
(Continued)

*Primary Examiner* — Ricardo Osorio
(74) *Attorney, Agent, or Firm* — Sughrue Mion, PLLC

(57) ABSTRACT

A display apparatus includes a display, a plurality of light sources provided to the display, a receiver, and a processor. The processor is configured to, based on an audio signal having a plurality of channels being received from the receiver, obtain a plurality of audio signals corresponding to the plurality of channels from the audio signal, respectively, identify a plurality of colors for the plurality of audio signals, respectively, based on a frequency component of the plurality of audio signals, respectively, among a plurality of frequency components, and control the plurality of light
(Continued)

sources to emit light with the plurality of colors, respectively, based on mapping of the plurality of light sources to the plurality of channels.

20 Claims, 15 Drawing Sheets

(58) Field of Classification Search
CPC ......... G06F 3/165; Y02B 20/40; H05B 47/10; H05B 47/155
See application file for complete search history.

(56) References Cited

U.S. PATENT DOCUMENTS

| | | | | |
|---|---|---|---|---|
| 3,623,392 | A * | 11/1971 | Boyler | A63J 17/00 |
| | | | | 84/464 R |
| 3,638,070 | A * | 1/1972 | Powell | H05B 41/3921 |
| | | | | 315/163 |
| 3,665,446 | A * | 5/1972 | Burm | A63J 5/10 |
| | | | | 340/815.56 |
| 4,257,062 | A * | 3/1981 | Meredith | H04N 11/00 |
| | | | | 345/697 |
| 7,139,617 | B1 | 11/2006 | Morgan et al. | |
| 7,369,903 | B2 | 5/2008 | Diederiks et al. | |
| 7,894,000 | B2 | 2/2011 | Gutta et al. | |
| 8,174,488 | B2 | 5/2012 | Kadijk et al. | |
| 8,179,400 | B2 | 5/2012 | Kwisthout | |
| 8,770,815 | B2 * | 7/2014 | Hardacker | H04N 5/64 |
| | | | | 362/605 |
| 9,117,350 | B2 | 8/2015 | Chi et al. | |
| 10,874,000 | B2 | 12/2020 | Fan et al. | |
| 2004/0156192 | A1 * | 8/2004 | Kerr | G06F 1/1601 |
| | | | | 362/154 |
| 2008/0258632 | A1 | 10/2008 | Lee | |
| 2010/0020251 | A1 | 1/2010 | Kadijk et al. | |
| 2011/0059795 | A1 | 3/2011 | Kondo et al. | |
| 2014/0177844 | A1 | 6/2014 | Greff et al. | |
| 2014/0335912 | A1 * | 11/2014 | Chi | H04M 1/0202 |
| | | | | 455/556.1 |
| 2015/0061884 | A1 * | 3/2015 | Hwang | H04N 21/4782 |
| | | | | 340/815.45 |
| 2017/0083280 | A1 | 3/2017 | Yu et al. | |
| 2020/0260542 | A1 * | 8/2020 | Fan | H05B 47/18 |
| 2020/0286345 | A1 * | 9/2020 | Murphy | A63F 13/215 |

FOREIGN PATENT DOCUMENTS

| | | |
|---|---|---|
| EP | 1 522 187 B1 | 4/2005 |
| EP | 1 525 747 B1 | 4/2005 |
| EP | 1 551 178 A1 | 7/2005 |
| EP | 1 704 729 B1 | 9/2006 |
| EP | 1 994 801 B1 | 11/2008 |
| JP | 2010-512677 A | 4/2010 |
| KR | 10-2008-0094394 A | 10/2008 |
| KR | 10-1021077 B1 | 3/2011 |
| KR | 10-1123194 B1 | 3/2012 |
| KR | 10-1411962 B1 | 6/2014 |
| KR | 10-1693109 B1 | 1/2017 |
| KR | 10-2017-0035502 A | 3/2017 |
| KR | 10-2017-0133950 A | 12/2017 |
| KR | 10-2043150 B1 | 11/2019 |
| WO | 2005/069640 A1 | 7/2005 |
| WO | 2008/142639 A1 | 11/2008 |
| WO | 2017/095103 A1 | 6/2017 |

OTHER PUBLICATIONS

Written Opinion (PCT/ISA/237) dated Jan. 15, 2021 issued by the International Searching Authority in International Application No. PCT/KR2020/013914.
Search Report dated Mar. 23, 2021 by the European Patent Office in European Application No. 20206534.8.

* cited by examiner

DISPLAY APPARATUS AND METHOD FOR CONTROLLING THEREOF

CROSS-REFERENCE TO RELATED APPLICATION(S)

This application is based on and claims priority under 35 U.S.C. § 119 to Korean Patent Application No. 10-2019-0143699, filed on Nov. 11, 2019, in the Korean Intellectual Property Office, the disclosure of which is incorporated by reference herein in its entirety.

BACKGROUND

1. Field

The disclosure relates to a display apparatus and a method for controlling thereof and more particularly relates to a display apparatus including at least one light source and a method for controlling thereof.

2. Description of Related Art

In recent years, various electronic apparatuses have been developed with the development of the electronic technologies. In particular, display apparatuses including a light source have been developed. Such display apparatuses aim at providing feeling of visual satisfaction to a user by emitting light through the light source.

However, the display apparatuses of the related art simply provide light of colors set by a user through the light source, and accordingly feeling of visual satisfaction is not sufficiently provided to a user.

SUMMARY

Provided are a display apparatus which controls light sources based on characteristics of audio signals to provide feeling of visual satisfaction to a user so that a user immerses in an image, and a method for controlling thereof.

Additional aspects will be set forth in part in the description which follows and, in part, will be apparent from the description, or may be learned by practice of the presented embodiments.

In accordance with an aspect of the disclosure, there is provided a display apparatus including a display, a plurality of light sources, a receiver, and a processor configured to, based on an audio signal having a plurality of channels being received from the receiver, obtain a plurality of audio signals corresponding to the plurality of channels from the audio signal, identify a plurality of colors corresponding to the plurality of audio signals based on a frequency component of each of the plurality of audio signals, and control the plurality of light sources to emit light with the plurality of colors based on information regarding the plurality of light sources mapped to the plurality of channels.

In accordance with an aspect of the disclosure, there is provided a method for controlling a display apparatus, the method including receiving an audio signal having a plurality of channels, obtaining a plurality of audio signals corresponding to the plurality of channels from the audio signal, identifying a plurality of colors corresponding to the plurality of audio signals based on a frequency component of each of the plurality of audio signals, and controlling a plurality of light sources to emit light with the plurality of colors based on information regarding the plurality of light sources mapped to the plurality of channels.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

The terms used herein have been selected as common terms as much as possible in consideration of functions described herein. But, these terms may vary with time in accordance with the intention of those skilled in the art, the precedent, technical interpretation, the emergence of new technologies and the like. In addition, there are also terms arbitrarily selected by the applicant. Such terms may be interpreted as defined herein and may be interpreted based on the specification and common technical knowledge of the technical field, if there are no specific term definitions herein.

Certain embodiments will be described in detail with reference to the accompanying drawings, but this is not limiting and various modifications may exist.

Figure 1A:
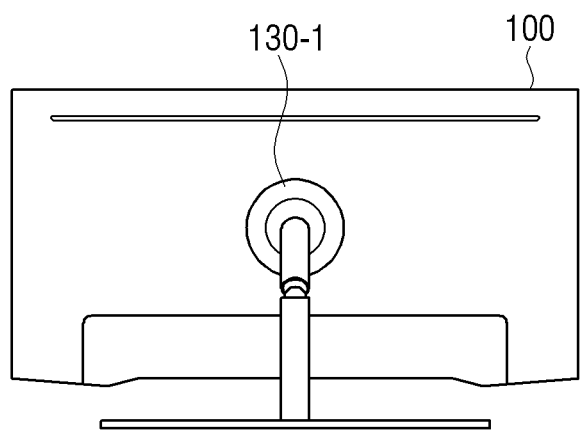
FIG. 1A is a view illustrating a rear surface of a display apparatus according to an embodiment.
Figure 1B:
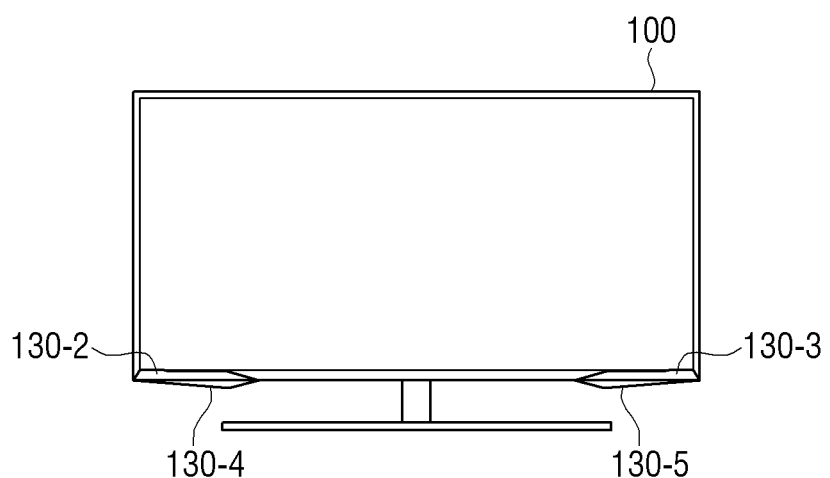
FIG. 1B is a view illustrating a front surface of the display apparatus according to an embodiment.

FIG. 1A is a view illustrating a rear surface of a display apparatus according to an embodiment, and FIG. 1B is a view illustrating a front surface of the display apparatus according to an embodiment.

A display apparatus 100 according to an embodiment may include a plurality of light sources. The plurality of light sources may be disposed on one side of the display. For example, referring to FIG. 1A, a first light source 130-1 may be disposed on an area of the rear surface of the display. Referring to FIG. 1B, a second light source 130-2 is disposed on the front surface of a lower left portion of the display, a third light source 130-3 may be disposed on the front surface of a lower right portion of the display, a fourth light source 130-4 may be disposed on a bottom surface of the lower left portion of the display, and a fifth light source 130-5 may be disposed on the bottom surface of the lower right portion of the display. The lower left portion of the display and the lower right portion of the display are disposed opposing each other with respect to a vertical axis through a center of the display, but this is not limiting.

Figure 1C:
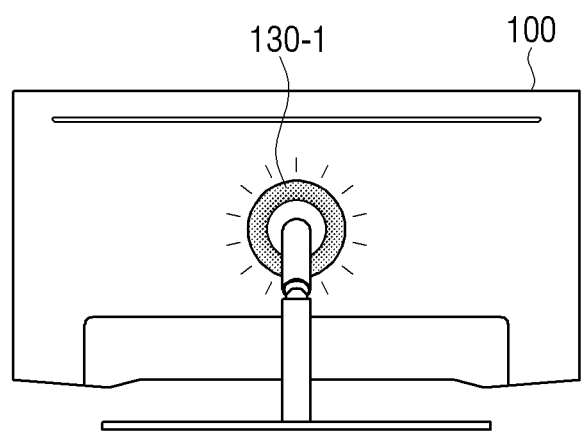
FIG. 1C is a view illustrating a case where a first light source emits light according to an embodiment.
Figure 1D:
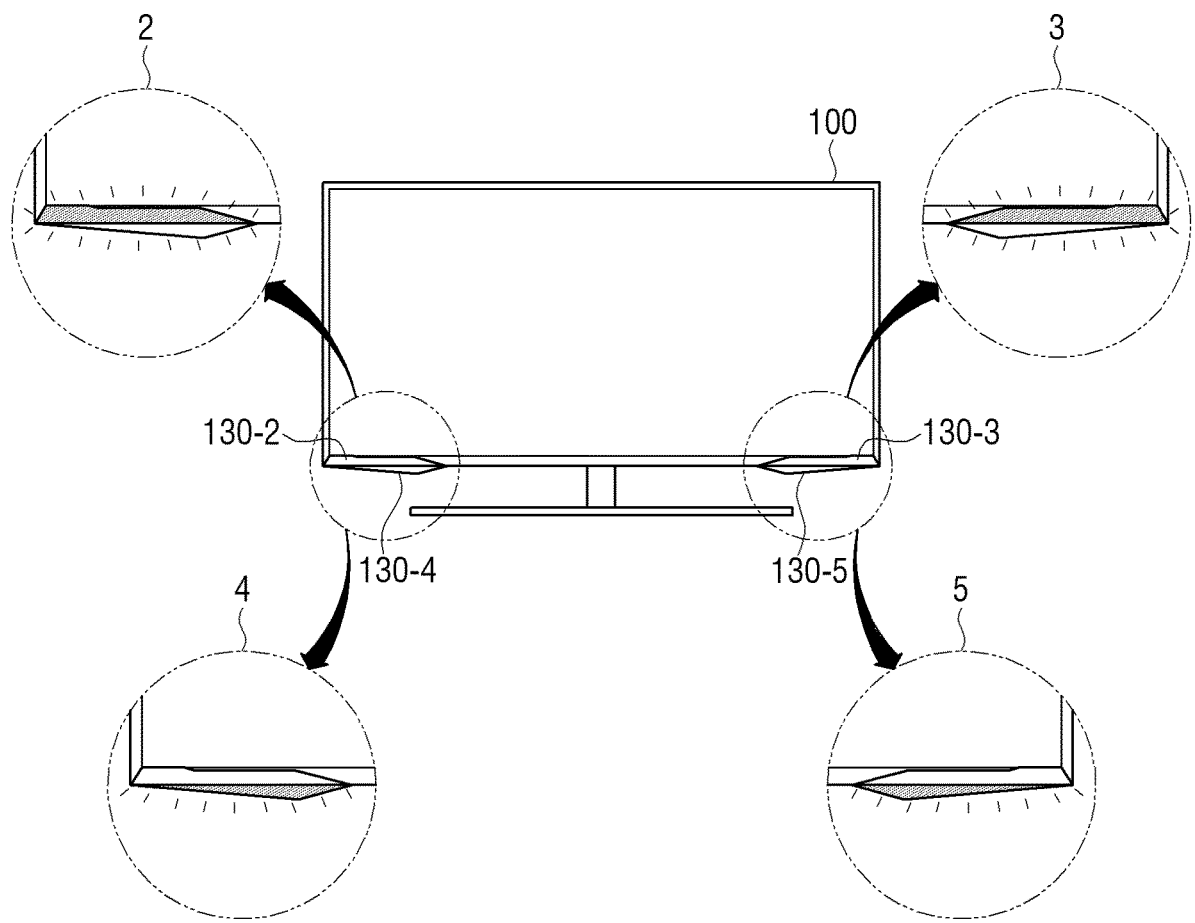
FIG. 1D is a view illustrating a case where second to fourth light sources emit light according to an embodiment.

The plurality of light sources may emit light. For example, referring to FIG. 1C, the first light source 130-1 may emit light from the rear surface of the display. Referring to FIG. 1D, the second light source 130-2 may emit light on the front surface of the lower left portion of the display (reference numeral 2), the third light source 130-3 may emit light on the front surface of the lower right portion of the display (reference numeral 3), the fourth light source 130-4 may emit light on the bottom surface of the lower left portion of the display (reference numeral 4), and the fifth light source 130-5 may emit light on the bottom surface of the lower right portion of the display (reference numeral 5).

The positions of the first to fifth light sources described above are merely an example and may be variously changed. For example, the second light source 130-2 may be disposed on the front surface of the upper left portion of the display and the third light source 130-3 may be disposed on the front surface of the upper right portion of the display. The second light source 130-2 may be disposed on an upper surface of the upper left portion of the display and the third light source 130-3 may be disposed on the upper surface of the upper right portion of the display.

The number of light sources described above is merely an example and the number of light sources may be variously changed. For example, the display apparatus 100 according to an embodiment may further include a sixth light source disposed on the front surface (or upper surface) of the upper left portion of the display and a seventh light source disposed on the front surface (or upper surface) of the upper right portion of the display, in addition to the first to fifth light sources of FIGS. 1A and 1B. The display apparatus 100 according to an embodiment may include two light sources and the two light sources may be the first light source on the front surface of the left portion of the display and the second light source on the front surface of the right portion of the display.

The display apparatus 100 according to an embodiment may exhibit a light effect through the plurality of light sources.

Figure 2:
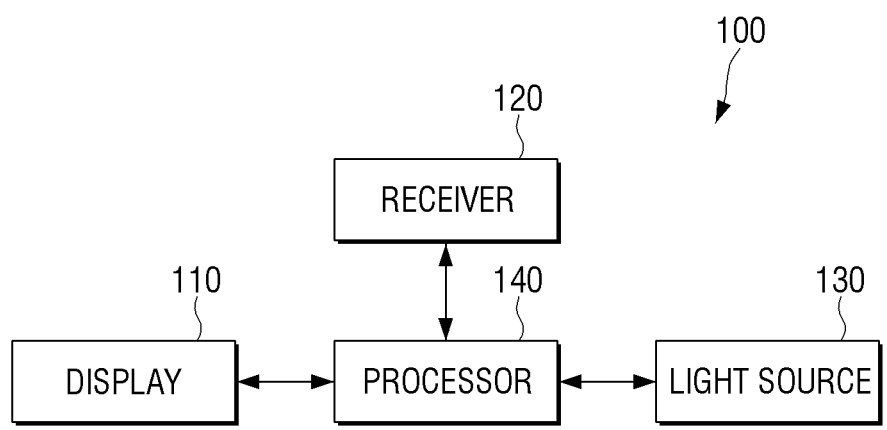
FIG. 2 is a block diagram for illustrating the display apparatus according to an embodiment.

FIG. 2 is a block diagram for illustrating the display apparatus according to an embodiment.

Referring to FIG. 2, the display apparatus 100 according to an embodiment may include a display 110, a receiver 120, a light source 130, and a processor 140.

The display 110 may display various images. The image may include at least one of a still image or a moving image and the display 110 may display various images such as a broadcasting content, a multi-media content, a game content, and the like. The display 110 may display various user interfaces (UI) and icons.

The display 110 described above may be implemented in various types of display such as a liquid crystal display (LCD) panel, a light emitting diode (LED), an organic light emitting diode (OLED), a liquid crystal on silicon (LCoS), a digital light processing (DLP), and the like. The display 110 may also include a driving circuit and/or a backlight unit which may be implemented as a-si TFT, a low temperature poly silicon (LTPS) TFT, or an organic TFT (OTFT).

The receiver 120 may receive an audio signal. The receiver 120 may receive the audio signal from an external apparatus through a sound card, a high-definition multimedia interface (HDMI), or DisplayPort (DP). The receiver 120 may receive the audio signal from the external apparatus through a wireless network. For this, the receiver 120 may include a Wi-Fi module, a Bluetooth module, a ZigBee module, and the like.

The light source 130 may emit light. The light source 130 may be implemented as an LED but is not limited thereto. The light source 130 may be variously implemented, such as an LCD, an OLED, an active-matrix organic light-emitting diode (AM-OLED), a plasma display panel (PDP), and the like.

The display apparatus 100 according to an embodiment may include the plurality of light sources. For example, as described with reference to FIGS. 1A and 1B, the display apparatus 100 may include the first to fifth light sources but there is no limitation thereto.

The processor 140 may control general operations of the display apparatus 100. For this, the processor 140 may include one or more of a central processing unit (CPU), an application processor (AP), or a communication processor (CP).

The processor 140 may operate an operating system or application programs to control hardware or software elements connected to the processor 140 and perform various data processing and operations. The processor 140 may load and process an instruction or data received from at least one of other elements to a volatile memory and store various pieces of data in a non-volatile memory.

The processor 140 may receive an audio signal via the receiver 120. The audio signal may be an audio signal received from an external apparatus (e.g., server, PC, user terminal device, or the like). For example, if a game application is executed, the processor 140 may receive an audio signal related to the game from an external server via the receiver 120. However, this is merely an example, and the audio signal may be an audio signal generated by execution of a content (e.g., music content, movie content, and the like) stored in the display apparatus 100 in advance.

The audio signal described above may be an audio signal having a plurality of channels. For example, the audio signal may include a first audio signal of a center (C) channel, a second audio signal of a left (L) channel, a third audio signal of a right (R) channel, a fourth audio signal of a left surround (LS) channel, and a fifth audio signal of a right surround (RS) channel, as audio signals of 5.1 channel.

However, this is merely an example, and the audio signal may be an audio signal of a stereo channel including a first audio signal of a left channel and a second audio signal of a right channel, and may be an audio signal of 7.1 channel including a first audio signal of a center channel, a second audio signal of a left channel, a third audio signal of a right channel, a fourth audio signal of a left surround channel, a fifth audio signal of a right surround channel, a sixth audio signal of a left back (LB) channel, and a seventh audio signal of a right back (RB) channel.

The processor 140 may obtain a plurality of audio signals corresponding to a plurality of channels from the audio signal having the plurality of channels. For example, the processor 140 may obtain the first audio signal of the center channel, the second audio signal of the left channel, the third audio signal of the right channel, the fourth audio signal of the left surround channel, and the fifth audio signal of the right surround channel from the audio signal of 5.1 channel.

For this, the processor 140 may identify the number of channels of the audio signal based on the information regarding the number of channels included in the audio signal. The processor 140 may divide the audio signal for each channel based on a preamble included in the audio signal and obtain a plurality of divided audio signals as the plurality of audio signals corresponding to the plurality of channels.

However, this is merely an example and the processor 140 may obtain the plurality of audio signals corresponding to the plurality of channels from the audio signal by various methods. For example, the processor 140 may divide a plurality of audio signals allocated for each channel (e.g., C, L, R, LS, and RS) in the audio signal based on an identifier of each channel, and obtain a plurality of divided audio signals as the plurality of audio signals corresponding to the plurality of channels.

The processor 140 may control the plurality of light sources based on the plurality of audio signals divided for each channel. The processor 140 may control the plurality of light sources based on information regarding the plurality of light sources mapped to the plurality of channels.

The information regarding the plurality of light sources mapped to the plurality of channels may include information regarding the light sources mapped to each of channel of the audio signal. For example, the information regarding the plurality of light sources mapped to the plurality of channels may include information regarding the first light source 130-1 mapped to the first audio signal of the center channel, information regarding the second light source 130-2 mapped to the second audio signal of the left channel, information regarding the third light source 130-3 mapped to the third audio signal of the right channel, information regarding the fourth light source 130-4 mapped to the fourth audio signal of the left surround channel, and information regarding the fifth light source 130-5 mapped to the fifth audio signal of the right surround channel. Accordingly, if an audio signal corresponding to a specific channel is obtained, the processor 140 may identify the light source mapped to the specific channel and control the corresponding light source to emit light.

Figure 3A:
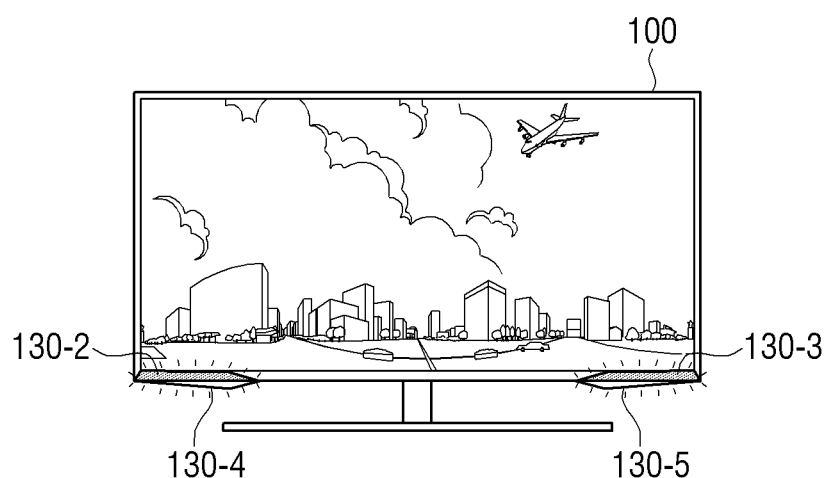
FIG. 3A is a view illustrating an embodiment in which a plurality of light sources are controlled based on an audio signal of a second channel and an audio signal of a third channel according to an embodiment.
Figure 3B:
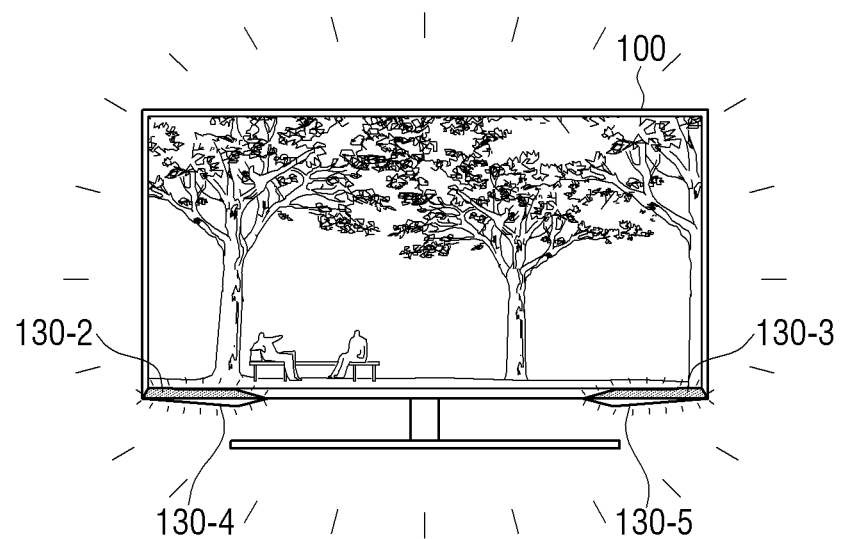
FIG. 3B is a view illustrating an embodiment in which the plurality of light sources are controlled based on an audio signal of a first channel, the audio signal of the second channel, and the audio signal of the third channel according to an embodiment.

For example, if the second and third audio signals are obtained, the processor 140 may control the second and third light sources 130-2 and 130-3 to emit light, as illustrated in FIG. 3A. If the first audio signal of the center channel, the second audio signal of the left channel, and the third audio signal of the right channel are obtained, the processor 140 may control the first, second, and the third light sources 130-1, 130-2, and 130-3 to emit light, as illustrated in FIG. 3B.

Therefore, a user may experience a stereoscopic visual effect with a stereophonic sound and may be highly immersed in the image.

The processor 140 may control the plurality of light sources to emit a plurality of colors based on frequency components of the plurality of audio signals corresponding to the plurality of channels. The plurality of audio signals may be signals converted into analog signals through a digital-to-analog converter (DAC).

For this, the processor 140 may identify whether the plurality of audio signals corresponding to the plurality of channels are audio signals having high frequency components, audio signals having low frequency components, or audio signals having medium frequency components.

The processor 140 may input the plurality of audio signals converted into analog signals into a plurality of filters. The plurality of filters may include a high pass filter, a low pass filter, and a band pass filter. The high pass filter may be a filter outputting a signal having a frequency component higher than a first frequency (e.g., 180 Hz), when the audio signal is received, and the low pass filter may be a filter outputting a signal having a frequency component lower than a second frequency (e.g., 165 Hz), when the audio signal is received. The band pass filter may be a filter outputting a signal having a frequency component lower than or equal to the first frequency (e.g., 180 Hz) and higher than or equal to the second frequency (e.g., 165 Hz), when the audio signal is received.

The processor 140 may identify the audio signal, among the plurality of audio signals, passed through the high pass filter as an audio signal having a high frequency component and the audio signal passed through the low pass filter as an audio signal having a low frequency component. The processor 140 may identify the audio signal passed through the band pass filter as an audio signal having a medium frequency component.

The processor 140 may identify a plurality of colors corresponding to the plurality of audio signals based on information regarding the plurality of colors mapped to the plurality of frequency components.

The information regarding the plurality of colors mapped to the plurality of frequency components may include information regarding a color mapped for each frequency component. For example, the information regarding the plurality of colors mapped to the plurality of frequency components may include information regarding a first color mapped to the high frequency component (e.g., frequency component higher than 180 Hz), information regarding a second color mapped to the medium frequency component (e.g., frequency component higher than 165 Hz and lower than 180 Hz), and information regarding a third color mapped to the low frequency component (e.g., frequency component lower than 165 Hz). The first color may be red, the second color may be blue, and the third color may be green, but there is no limitation thereto.

The processor 140 may control the plurality of light sources to emit light with a plurality of identified colors. The processor 140 may control a light source mapped to a channel of an audio signal having a high frequency component to emit the first color, control a light source mapped to a channel of an audio signal having a medium frequency component to emit the second color, and control a light source mapped to a channel of an audio signal having a low frequency component to emit the third color.

The first to third colors are exemplified herein, but this is merely an example. In accordance with an embodiment, if the frequency component of the audio signal is distinguished as one of first to fifth bands, the processor 140 may identify one of first, second, third, fourth and fifth colors as a color corresponding to the audio signal according to the frequency component of the audio signal.

The processor 140 may control the plurality of light sources based on the channel of the audio signal and the frequency component of the audio signal.

Figure 4:
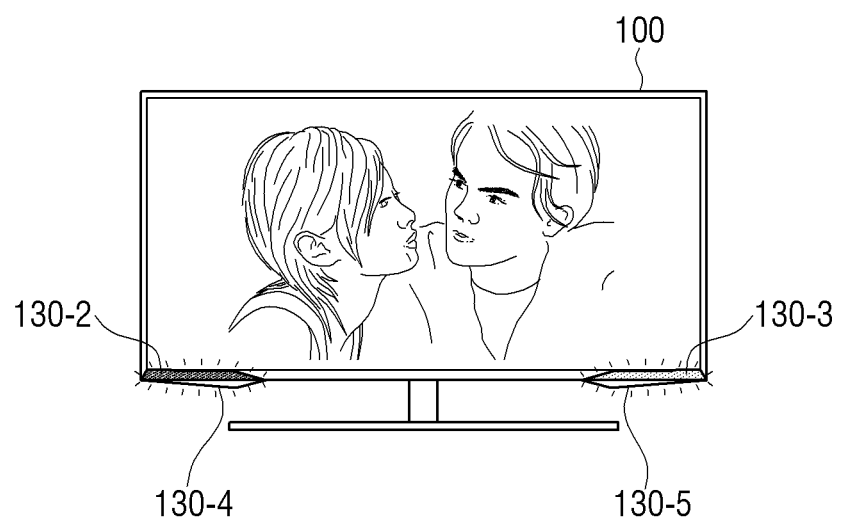
FIG. 4 is a view illustrating an embodiment in which the plurality of light sources are controlled based on frequency characteristic according to an embodiment.

For example, if the second audio signal of the left channel and the third audio signal of the right channel are obtained, the second audio signal has the high frequency component, and the third audio signal has the low frequency component, the processor 140 may control the second light source to emit the red light and control the third light source to emit the green light, as illustrated in FIG. 4. If all of the first to third audio signals have the high frequency component, the processor 140 may control the first, second, and third light sources to emit the red light. According to an embodiment, the plurality of colors may be different or the same.

Accordingly, a user may visually confirm at which position a sound of the high frequency component is output or at which position a sound of the low frequency component is output and may concentrate on the image with a high level of immersion.

As described above, the filter includes the high pass filter, the low pass filter, and the band pass filter, but some of these elements may be omitted according to an embodiment.

As described above, the audio signal is identified as a signal having the high frequency component, a signal having the low frequency component, or a signal having the medium frequency component, for each band of the frequency. According to an embodiment, the processor 140 may identify the plurality of colors corresponding to the plurality of audio signals based on the frequency component itself.

For this, the processor 140 may analyze a frequency sampling value of the plurality of audio signals and identify the frequency components of the plurality of audio signals. The processor 140 may identify a color mapped to the identified frequency component based on the information regarding the plurality of colors mapped to the plurality of frequency components. For example, if the frequency of the audio signal is a first frequency, the processor 140 may identify the first color mapped to the first frequency based on the information regarding the plurality of colors mapped to the plurality of frequency components. If the first frequency described above is a frequency of the audio signal of the center channel, the processor 140 may control the first light source to emit the first color. As described above, by controlling the plurality of light sources based on the frequency components, the disclosure may provide a visual effect to a user through light with more colors.

According to an embodiment, the plurality of signals of the same channel may be received via the receiver 120. For example, in accordance with execution of a game content, an audio signal of the first channel corresponding to a sound of gun may be received according to user manipulation, while receiving an audio signal of the first channel corresponding to background music of the game content.

As described above, if a second audio signal of the first channel is received together with the first audio signal of the first channel, the processor 140 may control a light source mapped to the first channel among the plurality of light sources to emit a color obtained by combining the first color corresponding to the first audio signal and the second color corresponding to the second audio signal.

The processor 140 may identify the first color corresponding to the first audio signal based on the frequency component of the first audio signal, when the first audio signal of the first channel is received, identify the second color corresponding to the second audio signal based on the frequency component of the second audio signal, when the second audio signal of the first channel is received, and control the light source mapped to the first channel to emit light with a color obtained by combining the first and second colors.

For example, if the first audio signal of the first channel is a signal having a high frequency component and the second audio signal of the first channel is a signal having a low frequency component, the processor 140 may control the first light source which is a light source mapped to the first channel to emit a color obtained by combining red and green.

In an embodiment, if the second audio signal of the first channel is received together with the first audio signal of the first channel, the processor 140 may control the first light source which is a light source mapped to the first channel to emit light with one of the first and second colors according to priority. For example, if the priority of the audio signal having a higher frequency is set to be higher than the priority of the audio signal having a lower frequency, the processor 140 may identify an audio signal having a high frequency component among the first and second audio signals and control the light source to emit a light with a color corresponding to the audio signal having the high frequency component. For example, as in an embodiment described above, if the frequency of the first audio signal is higher than the frequency of the second audio signal, the processor 140 may control the first light source to emit red light.

The processor 140 may obtain the plurality of audio signals corresponding to the plurality of channels from the audio signal having the plurality of channels, identify a magnitude of amplitude of the plurality of audio signals, and adjust intensity of light emitted by the light source according to the magnitude of the amplitude.

The processor 140 may identify a magnitude of the amplitude corresponding to each audio signal from the plurality of sampled audio signals. The processor 140 may convert the obtained audio signal into an analog signal through a DAC and identify the magnitude of the amplitude corresponding to each audio signal based on a voltage value of the analog signal.

The processor 140 may control the light source to emit light with brightness different according to the magnitude of the amplitude. For example, the processor 140, if the magnitude of the amplitude of the audio signal is a first magnitude, may control the light source to emit light with first brightness corresponding to the firsts magnitude, and if the magnitude of the amplitude of the audio signal is a second magnitude, may control the light source to emit light with second brightness corresponding to the second magnitude. The first magnitude may be greater than the second magnitude and the first brightness may be brighter than the second brightness.

The processor 140 may control the plurality of light sources based on at least one of the channel of the audio signal and the frequency component of the audio signal, and the magnitude of the amplitude of the audio signal.

Figure 5A:
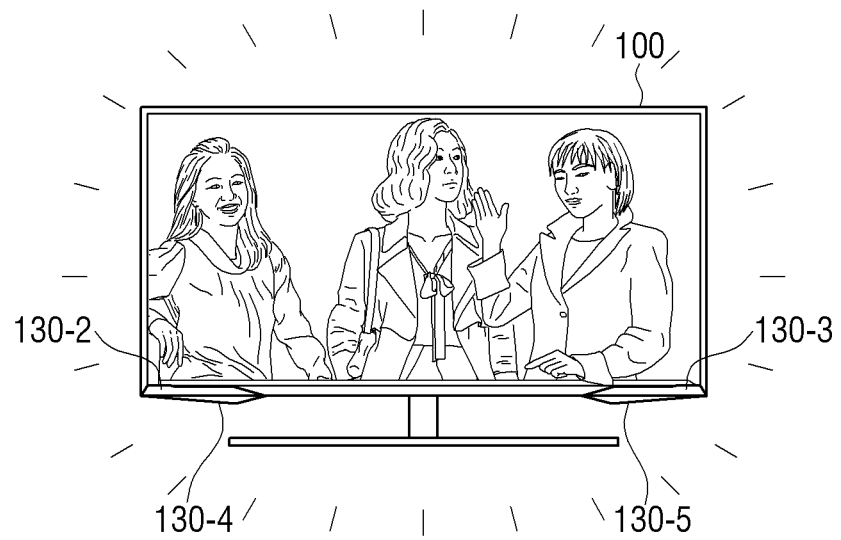
FIG. 5A is a view illustrating the display apparatus which emits light with first brightness according to an embodiment.
Figure 5B:
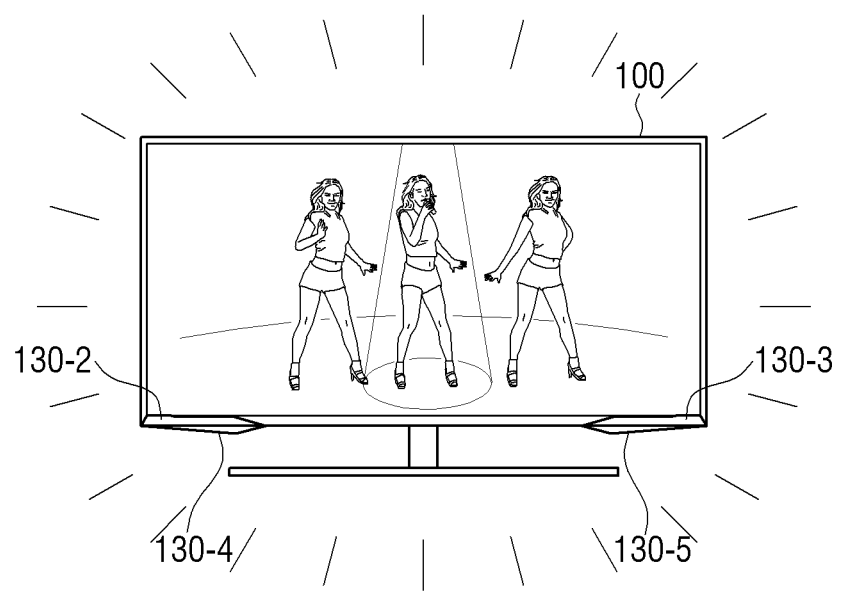
FIG. 5B is a view illustrating the display apparatus which emits light with second brightness according to an embodiment.

For example, referring to FIG. 5A, if the obtained audio signal is the audio signal of the center channel and the magnitude of the amplitude of the audio signal is the first magnitude, the processor 140 may control the first light source 130-1 to emit light with first brightness. Referring to FIG. 5B, if the obtained audio signal is an audio signal of the center channel and the magnitude of the amplitude of the audio signal is the second magnitude greater than the first magnitude, the processor 140 may control the first light source 130-1 to emit light with the second brightness of a higher intensity, i.e., brighter than the first brightness.

If the obtained audio signal is a signal having a high frequency component and the magnitude of the amplitude of the audio signal is the first magnitude, the processor 140 may control the light source to emit red light with first brightness.

If the obtained audio signal is the audio signal of the center channel, the frequency component of the audio signal is a high frequency component, and the magnitude of the amplitude of the audio signal is the first magnitude, the processor 140 may control the first light source to emit the red light with the first brightness. The processor 140 may control the plurality of light sources to emit light with different colors with different brightness according to the channel, the frequency component, and the magnitude of the amplitude of the audio signal.

The processor 140 may obtain the plurality of audio signals corresponding to the plurality of channels from the audio signal having the plurality of channels, identify a plurality of tempos corresponding to the plurality of audio signals, and control the plurality of light sources to blink on and off at a plurality of speeds corresponding to the plurality of tempos.

The processor 140 may convert the plurality of audio signals into an analog signal through the DAC and identify tempos of the plurality of audio signals based on bit number included in the analog signal. The processor 140 may identify tempos of the plurality of audio signals based on tempo information included in the audio signal received via the receiver 120.

The processor 140 may control the light sources to blink on and off at different speeds according to the tempos of the audio signals. For example, if a tempo of an audio signal is a first tempo, the processor 140 may control the light source to blink on and off at a first speed, and if the tempo of the audio signal is a second tempo, the processor 140 may control the light source to blink on and off at a second speed. The second tempo may be faster than the first tempo and the second speed may be faster than the first speed, but there is no limitation thereto.

The processor 140 may control the plurality of light sources based on at least one of the channel of the audio signal, the frequency component of the audio signal, and the magnitude of the amplitude of the audio signal and the tempo of the audio signal.

Figure 6A:
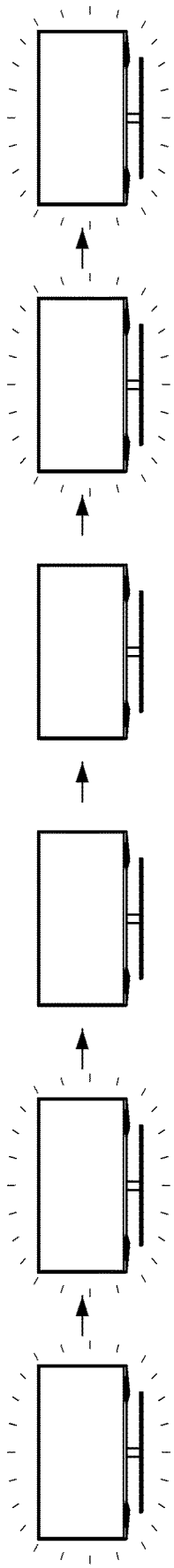
FIG. 6A is a view illustrating the display apparatus which emits light at a first speed according to an embodiment.
Figure 6B:
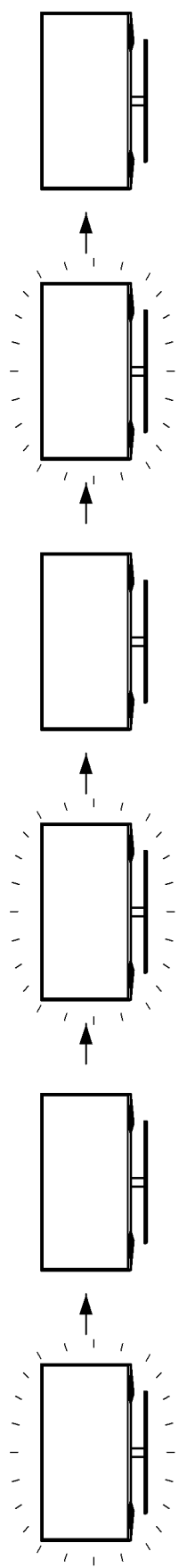
FIG. 6B is a view illustrating the display apparatus which emits light at a second speed according to an embodiment.

For example, referring to FIG. 6A, if the audio signal is the audio signal of the center channel and the tempo of the audio signal is the first tempo, the processor 140 may control the first light source to emit light at the first speed. Referring to FIG. 6B, if the audio signal is the audio signal of the center channel and the tempo of the audio signal is the second tempo faster than the first tempo, the processor 140 may control the first light source to emit light at the second speed faster than the first speed.

If the audio signal is the audio signal of the center channel, the magnitude of the amplitude of the audio signal is the first magnitude, and the tempo of the audio signal is the first tempo, the processor 140 may control the first light source to emit light with the first brightness corresponding to the first magnitude.

Accordingly, a user may have increased level of immersion in the image with the light sources that blink on and off at a fast speed, when a sound with a high bpm is output.

Figure 7:
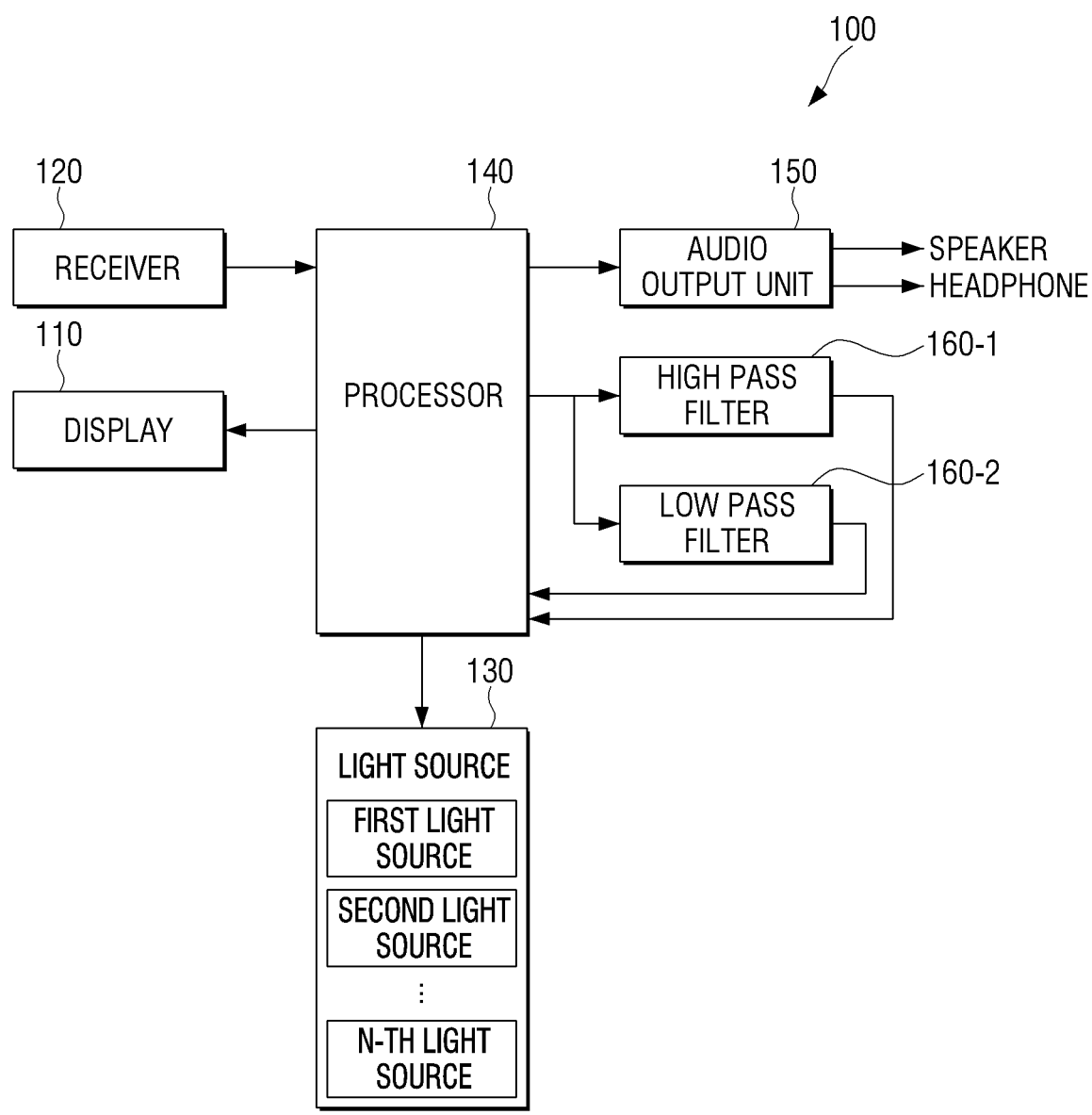
FIG. 7 is a block diagram of the display apparatus according to an embodiment.

FIG. 7 is a block diagram of the display apparatus according to an embodiment.

Referring to FIG. 7, the display apparatus 100 according to an embodiment may include the display 110, the receiver 120, the plurality of light sources 130 including first to n-th light sources, an audio output unit 150, a high pass filter 160-1, a low pass filter 160-2, and the processor 140. However, this is merely an example and the display apparatus 100 may further include elements other than the elements described above.

The receiver 120 may receive an audio signal. The receiver 120 may receive an audio signal from an external apparatus through a sound card, an HDMI, or DP. The receiver 120 may receive the audio signal from the external apparatus via wireless networks. For this, the receiver 120 may include a Wi-Fi module, a Bluetooth module, a ZigBee module, and the like.

The receiver 120 may receive content data including an image signal and an audio signal. In this case, the processor 140 may demultiplex the content data into the image signal and the audio signal through a demultiplexer (demux) and decode the image signal and the audio signal divided due to the demultiplexing.

The processor 140 may output an image via the display 110 based on the decoded image signal and output a sound via the audio output unit 150 based on the decoded audio signal. According to an embodiment, in a case of the decoded audio signal, the sound may be output via a speaker or a headphone through a DAC and a low-frequency amplifier. The sound may be output via a speaker of the display apparatus 100 or may be output via a speaker of an external apparatus such as a sound bar.

The processor 140 may control the plurality of light sources 130 based on at least one of the channel, the frequency component, the magnitude of the amplitude, and the tempo of the audio signal. When the content data is received, the processor 140 may display an image based on an image signal included in the content data on the display 110 and control the plurality of light sources 130 to emit light based on the audio signal included in the content data.

For example, when the audio signal having the center channel, the audio signal having the left channel, the audio signal having the right channel, the audio signal having the left surround channel, and the audio signal having the right surround channel are received, the processor 140 may control the light emission of the first to fifth light sources.

The processor 140 may identify a color corresponding to the audio signal of the center channel and control the first light source to emit light with the color corresponding to the audio signal of the center channel based on the frequency component of the audio signal corresponding to the center channel among the plurality of audio signals, and may identify a color corresponding to the audio signal of the left channel and control the second light source to emit light with the color corresponding to the audio signal of the left channel based on the frequency component of the audio signal corresponding to the left channel among the plurality of audio signals. The processor 140 may identify a color corresponding to the audio signal of the left surround channel and control the fourth light source to emit light with the color corresponding to the audio signal of the left surround channel based on the frequency component of the audio signal corresponding to the left surround channel among the plurality of audio signals, identify a color corresponding to the audio signal of the right channel and control the third light source to emit light with the color corresponding to the audio signal of the right channel based on the frequency component of the audio signal corresponding to the right channel among the plurality of audio signals, and identify a color corresponding to the audio signal of the right surround channel and control the fifth light source to emit light with the color corresponding to the audio signal of the right surround channel based on the frequency component of the audio signal corresponding to the right surround channel among the plurality of audio signals.

The frequency component of the audio signal may be identified based on the high pass filter 160-1 and the low pass filter 160-2. The processor 140 may input a plurality of audio signals to the high pass filter 160-1 and the low pass filter 160-2, identify that the audio signal has a high frequency component, if the audio signal is output via the high pass filter 160-1, and identify that the audio signal has a low frequency component, if the audio signal is output via the low pass filter 160-2.

The processor 140 may perform upmixing or downmixing of the audio signal based on the number of light sources. When the audio signal having the number of channels smaller than the number of light sources is received via the receiver 120, the processor 140 may perform the upmixing of the audio signal so that the audio signal has the number of channels same as the number of light sources, and when the audio signal having the number of channels greater than the number of light sources is received via the receiver 120, the processor 140 may perform the downmixing of the audio signal so that the audio signal has the number of channels same as the number of light sources.

For example, when the plurality of light sources are first and second light sources and the audio signal having five channels are received, the processor 140 may perform the downmixing of the audio signal to a signal having two channels. The processor 140 may control the first and second light sources based on the characteristics of the audio signal of the left channel and the characteristics of the audio signal of the right channel.

When the plurality of light sources are first to fifth light sources and the audio signal having seven channels is received, the processor 140 may perform the upmixing of the audio signal to a signal having seven channels. The processor 140 may control the first to fifth light sources based on the audio signal of the center channel, the audio signal of the left channel, the audio signal of the right channel, the audio signal of the left surround channel, and the audio signal of the right surround channel.

Accordingly, the display apparatus may sufficiently provide a visual effect to a user, even if the audio signal having the number of channels different from the number of light sources is received.

Figure 8:
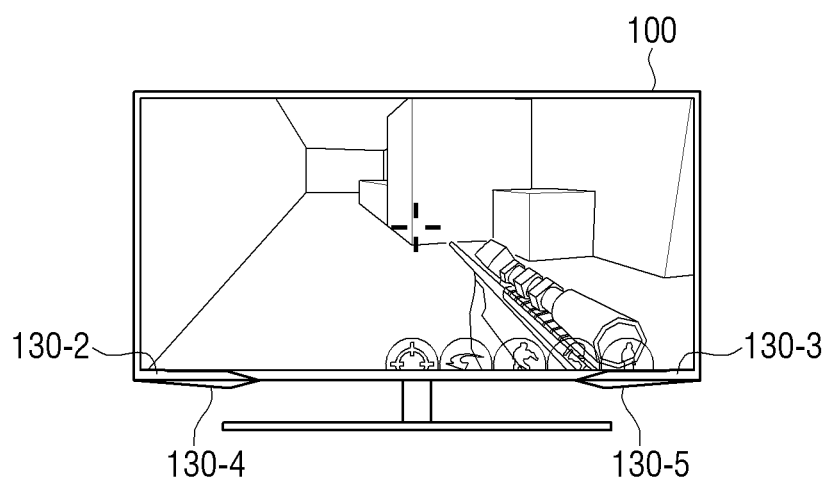
FIG. 8 is a view for illustrating an embodiment in which the display apparatus controls the light sources based on information regarding a position of an object included in content data according to an embodiment.

FIG. 8 is a view for illustrating an embodiment in which the display apparatus controls the light sources based on information regarding a position of an object included in content data according to an embodiment.

The processor 140 may receive content data including an image signal and an audio signal via the receiver 120. The content data may be data received from the external server by execution of a game application but is not limited thereto, and may be various types of data such as data received by execution of a movie application.

The processor 140 may display the image via the display 110 based on an image signal included in the content data. For example, the processor 140 may include a graphics processing unit (GPU) but there is no limitation thereto.

The processor 140 may control the plurality of light sources based on the plurality of audio signals included in the content data. The processor 140 may control the plurality of light sources 130 based on at least one of the channel, the frequency component, the magnitude of the amplitude, and the tempo of the audio signal.

The processor 140 may control at least one light source based on information regarding a position of an object included in the content data. For example, the processor 140 may control at least one light source based on information regarding a position of an object included in an image displayed on the display. The object may be an object displayed on the display 110 based on an image signal or an object to be displayed on the display 110 based on an image signal. For example, if the content data is data related to a game content, the object may be a character displayed on a game image or a character to be displayed on a game image.

When the content data is received, the processor 140 may identify an audio signal generated based on the object among the plurality of audio signals included in the content data. The audio signal generated based on the object is an audio signal generated according to a user command input to an input unit (e.g., mouse or keyboard) and may be an audio signal generated when the user inputs a command to throw a bomb via the input unit and a character of the user throws a bomb. The content data may further include information regarding the object mapped to the audio signal and the processor 140 may identify the audio signal generated based on the object among the plurality of audio signals based on the information regarding the object mapped to the audio signal.

The processor 140 may identify a distance between a first object of a first user and a second object of a second user based on information regarding positions of the objects included in the content data. The information regarding the positions of objects may be positions of objects on a map of the content provided by the content data. The first object of the first user may be a character of the first user and the second object of the second user may be a character of the second user. The audio signal generated based on the object described above may be an audio signal generated based on the second object. Hereinafter, for convenience of description, the audio signal generated based on the second object may be referred to an audio signal of the second object.

The processor 140 may control the light source mapped to the channel of the audio signal of the second object based on the distance between the first and second objects.

The processor 140 may control the light source mapped to the channel of the audio signal of the second object based on at least one of the channel, the frequency component, the magnitude of the amplitude, and the tempo of the audio signal, and the distance between the first and second objects.

The processor 140 may control the light source mapped to the channel of the audio signal of the second object among the plurality of light sources based on the channel of the audio signal of the second object. For example, if the channel of the audio signal of the second object is the center channel, the processor 140 may control the first light source positioned on the rear surface of the display 110 to emit light.

The processor 140 may identify a color corresponding to the audio signal of the second object based on the frequency component of the audio signal of the second object and the distance between the first and second objects. When it is identified that the distance between the first and second objects is a first distance and the frequency of the audio signal of the second object is a first frequency, the processor 140 may identify a color having a lower gradation than a color identified based on the information regarding a plurality of colors mapped to the plurality of frequency components as the color corresponding to the audio signal of the second object. For example, when the distance between the first and second objects is the first distance, the color corresponding to the first frequency is red, and the channel of the audio signal of the second object is the center channel, the processor 140 may control the first light source to emit orange light.

When it is identified that the distance between the first and second objects is a second distance and the frequency of the audio signal of the second object is the first frequency, the processor 140 may identify a color having a higher gradation than the color identified based on the information regarding the plurality of colors mapped to the plurality of frequency components as the color corresponding to the audio signal of the second object. For example, when the distance between the first and second objects is the second distance, the color corresponding to the first frequency is red, and the channel of the audio signal of the second object is the center channel, the processor 140 may control the first light source to emit red light. The first distance described above may be longer than the second distance but is not limited thereto.

The processor 140 may identify the brightness corresponding to the audio signal of the second object based on the magnitude of the amplitude of the audio signal of the second object and the distance between the first and the second objects.

When it is identified that the distance between the first and second objects is the first distance and the magnitude of the amplitude of the audio signal of the second object is the first magnitude, the processor 140 may identify the color with the brightness lower than the color identified based on the plurality of pieces of brightness information mapped to the plurality of magnitudes, as the color corresponding to the audio signal of the second object. For example, when the distance between the first and second objects is the first distance, the brightness corresponding to the first magnitude is the first brightness, the channel of the audio signal of the second object is the center channel, and the color corresponding to the audio signal of the second object is red, the processor 140 may control the first light source to emit red light with lower brightness than the first brightness.

When it is identified that the distance between the first and second objects is the second distance and the magnitude of the amplitude of the audio signal of the second object is the first magnitude, the processor 140 may identify the brightness that is higher than the brightness identified based on the plurality of pieces of brightness information mapped to the plurality of magnitudes as the brightness corresponding to the audio signal of the second object. For example, when the distance between the first and second objects is the second object, the brightness corresponding to the first magnitude is the first brightness, the channel of the audio signal of the second object is the center channel, and the color corresponding to the audio signal of the second object is red, the processor 140 may control the first light source to emit red light with the brightness higher than the first brightness. The first distance described above may be longer than the second distance, but is not limited thereto.

Therefore, a user may divide the audio signal generated by a character near by the character of the user and the audio signal generated by a character far away from the character of the user, and receive a stereoscopic illuminance effect.

Figure 9:
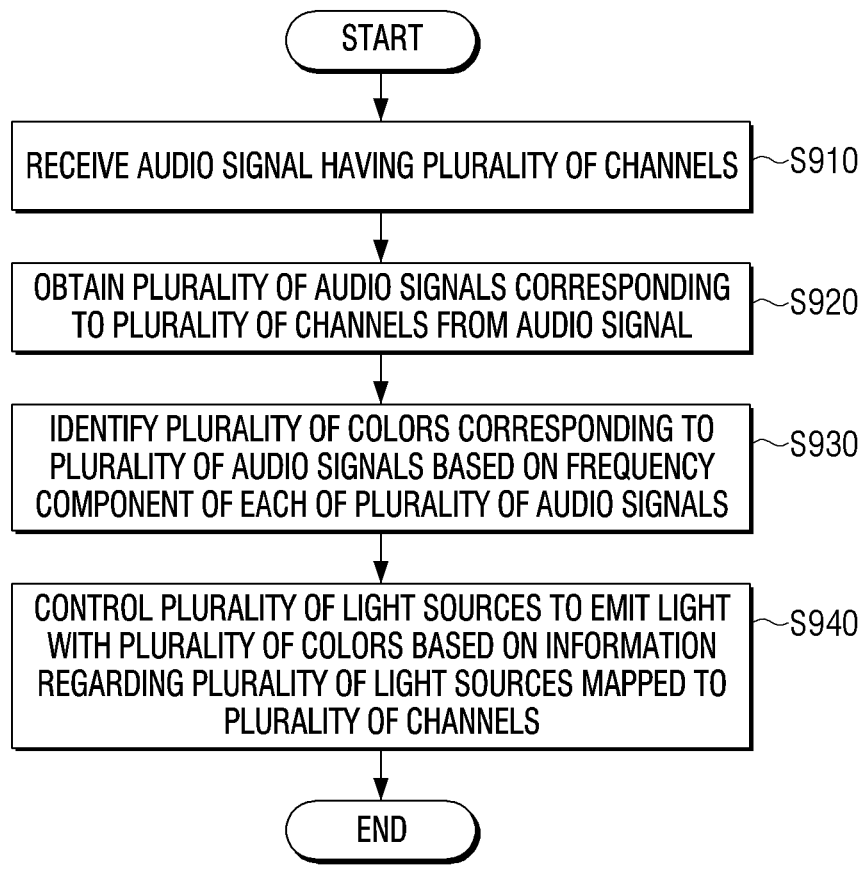
FIG. 9 is a flowchart for illustrating operations of the display apparatus according to an embodiment.

FIG. 9 is a flowchart for illustrating operations of the display apparatus according to an embodiment.

The display apparatus 100 may receive an audio signal having a plurality of channels (operation S910).

The display apparatus 100 may receive the audio signal from an external apparatus through a sound card, an HDMI, or DP. The display apparatus 100 may receive the audio signal from the external apparatus through a wireless network. For this, the receiver 120 may include a Wi-Fi module, a Bluetooth module, a ZigBee module, and the like.

For example, when a game application is executed, the display apparatus 100 may receive an audio signal related to a game from an external server. However, this is merely an example, and the audio signal may be an audio signal generated by execution of a content (e.g., music content, movie content, and the like) stored in the display apparatus 100 in advance.

The audio signal described above may be an audio signal having a plurality of channels. For example, the audio signal may include a first audio signal of a center (C) channel, a second audio signal of a left (L) channel, a third audio signal of a right (R) channel, a fourth audio signal of a left surround (LS) channel, and a fifth audio signal of a right surround (RS) channel, as audio signals of 5.1 channel.

The display apparatus 100 may obtain a plurality of audio signals corresponding to a plurality of channels from the audio signal (operation S920).

For this, the display apparatus 100 may identify the number of channels of the audio signal based on the information regarding the number of channels included in the audio signal. The display apparatus 100 may divide the audio signal for each channel based on a preamble included in the audio signal and obtain a plurality of divided audio signals as the plurality of audio signals corresponding to the plurality of channels.

However, this is merely an example and the display apparatus 100 may obtain the plurality of audio signals corresponding to the plurality of channels from the audio signal by various methods. For example, the display apparatus 100 may divide a plurality of audio signals allocated for each channel (e.g., C, L, R, LS, and RS) in the audio signal based on an identifier of each channel, and obtain a plurality of divided audio signals as the plurality of audio signals corresponding to the plurality of channels.

The display apparatus 100 may identify a plurality of colors corresponding to a plurality of audio signals based on frequency components of the plurality of audio signals (operation S930). The plurality of audio signals may be signals converted into analog signals through a DAC.

The display apparatus 100 may input the plurality of audio signals converted into analog signals to a plurality of filters. The plurality of filters may include a high pass filter, a low pass filter, and a band pass filter.

The display apparatus 100 may identify the audio signal, among the plurality of audio signals, passed through the high pass filter as an audio signal having a high frequency component and the audio signal passed through the low pass filter as an audio signal having a low frequency component. The display apparatus 100 may identify the audio signal passed through the band pass filter as an audio signal having a medium frequency component.

The display apparatus 100 may identify a plurality of colors corresponding to the plurality of audio signals based on information regarding the plurality of colors mapped to the plurality of frequency components. The information regarding the plurality of colors mapped to the plurality of frequency components may include information regarding a color mapped for each frequency component.

The display apparatus 100 may control the plurality of light sources to emit light with a plurality of colors based on the information regarding the plurality of light sources mapped to the plurality of channels (operation S940). The information regarding the plurality of light sources mapped to the plurality of channels may include information regarding the light sources mapped to each of channel of the audio signal.

According to embodiments, it is possible to provide a display apparatus controlling a plurality of light sources based on characteristics of an audio signal and a method for controlling thereof. Thus, a user may have sufficient feeling of visual satisfaction and increased level of immersion in an image.

Embodiments may be implemented as software containing one or more instructions that are stored in machine-readable (e.g., computer-readable) storage medium (e.g., internal memory or external memory). A processor may call instructions from a storage medium and is operable in accordance with the called instructions, including an electronic apparatus (e.g., the display apparatus 100). When the instruction is executed by a processor, the processor may perform the function corresponding to the instruction, either directly or under the control of the processor, using other components. The instructions may contain a code made by a compiler or a code executable by an interpreter. The machine-readable storage medium may be provided in the form of a non-transitory storage medium.

The methods according to embodiments may be implemented as software or an application installable in the display apparatus The methods according to an embodiment may be implemented simply by the software upgrade or hardware upgrade in the display apparatus of the related art, as a non-limiting example.

The above-described embodiments may be performed through an embedded server provided in the display apparatus or an external server of an electronic device.

A non-transitory computer-readable medium storing programs for sequentially performing the method for controlling the display apparatus according to the disclosure may be provided.

The non-transitory computer-readable medium is not a medium storing data for a short period of time such as a register, a cache, or a memory, but means a medium that semi-permanently stores data and is readable by a machine. The various applications or programs described above may be stored and provided to the non-transitory computer-readable medium such as a CD, a DVD, a hard disk drive, a Blu-ray disc, a USB, a memory card, and a ROM.

While certain embodiments have been particularly shown and described with reference to the drawings, embodiments are provided for the purposes of illustration and it will be understood by one of ordinary skill in the art that various modifications and equivalent other embodiments may be made from the disclosure. Accordingly, the true technical scope of the disclosure is defined by the technical spirit of the appended claims.

What is claimed is:

1. A display apparatus comprising:
   a display;
   a plurality of light sources;
   a receiver; and
   a processor configured to:
      based on an audio signal having a plurality of channels being received from the receiver, obtain a plurality of audio signals corresponding to the plurality of channels from the audio signal,
      identify a plurality of colors corresponding to the plurality of audio signals based on a frequency component of each of the plurality of audio signals, and
      control the plurality of light sources to emit light with the plurality of colors based on information regarding the plurality of light sources mapped to the plurality of channels,
   wherein the processor is further configured to:
      identify a first audio signal among the plurality of audio signals as corresponding to a first channel among the plurality of channels,
      identify a first light source among the plurality of light sources that is mapped to the first audio signal of the first channel, and
      control the first light source to emit light of a color that has been identified to correspond to the first audio signal among the plurality of colors.

2. The display apparatus according to claim 1, further comprising:
   a plurality of filters,
   wherein the processor is further configured to:
      input the plurality of audio signals to the plurality of filters,
      identify the frequency component of the plurality of audio signals, based on a plurality of signals output from the plurality of filters, respectively, and
      identify the plurality of colors corresponding to the plurality of audio signals, respectively, based on information regarding the plurality of colors mapped to a plurality of frequency components,
   wherein the frequency component is one of the plurality of frequency components.

3. The display apparatus according to claim 2, wherein the plurality of filters comprises:
   a high pass filter for passing a signal having a frequency component higher than a first frequency, among the plurality of frequency components;
   a low pass filter for passing a signal having a frequency component lower than a second frequency, among the plurality of frequency components; and
   a band pass filter for passing a signal having a frequency component lower than or equal to the first frequency and higher than or equal to the second frequency, among the plurality of frequency components.

4. The display apparatus according to claim 1, wherein the first light source is positioned on a rear surface of the display, and
   wherein the processor is further configured to:
      identify a first color among the plurality of colors that corresponds to the first audio signal of a center channel based on a frequency component of the first audio signal among the plurality of audio signals, and
      control the first light source to emit light with the first color,
   wherein the color is the first color, and
   wherein the first channel is the center channel.

5. The display apparatus according to claim 4, wherein the plurality of light sources further comprises:
   a second light source and a fourth light source that are positioned on a lower left portion of the display with respect to a vertical axis through a center of the display, and
   a third light source and a fifth light source that are positioned on a lower right portion of the display with respect to the vertical axis, and
   wherein the processor is further configured to:
      identify a second color among the plurality of colors that corresponds to a second audio signal of a left channel based on a frequency component of the second audio signal among the plurality of audio signals,
control the second light source to emit light with the second color,
identify a third color among the plurality of colors that corresponds to a third audio signal of a right channel based on a frequency component of the third audio signal among the plurality of audio signals,
control the third light source to emit light with the third color,
identify a fourth color among the plurality of colors that corresponds to a fourth audio signal of a left surround channel based on a frequency component of the fourth audio signal among the plurality of audio signals,
control the fourth light source to emit light with the fourth color,
identify a fifth color among the plurality of colors that corresponds to a fifth audio signal of a right surround channel based on a frequency component of the fifth audio signal among the plurality of audio signals, and
control the fifth light source to emit light with the fifth color,
wherein some or all of the first color, the second color, the third color, the fourth color, and the fifth color are the same, or all of the first color, the second color, the third color, the fourth color, and the fifth color are different from one another.

6. The display apparatus according to claim 5, wherein the second light source is positioned on a front surface of the lower left portion of the display,
the fourth light source is positioned on a bottom surface of the lower left portion,
the third light source is positioned on a front surface of the lower right portion of the display, and
the fifth light source is positioned on a bottom surface of the lower right portion.

7. The display apparatus according to claim 1, wherein the processor is further configured to:
identify a first color, among the plurality of colors, corresponding to the first audio signal based on a frequency component of the first audio signal,
based on a second audio signal among the plurality of audio signals that corresponds to the first channel being received via the receiver, identify a second color, among the plurality of colors, corresponding to the second audio signal based on a frequency component of the second audio signal, and
control a light source mapped to the first channel among the plurality of light sources to emit light with a third color obtained by combining the first color and the second color, and
wherein the color is the first color.

8. The display apparatus according to claim 1, wherein the processor is further configured to:
identify magnitudes of amplitudes of the plurality of audio signals, respectively, and
control the plurality of light sources to emit light with the plurality of colors and different brightness according to the magnitudes of amplitudes, respectively.

9. The display apparatus according to claim 1, wherein the processor is further configured to:
identify a plurality of tempos corresponding to the plurality of audio signals, respectively, and
control the plurality of light sources to blink on and off at a plurality of speeds corresponding to the plurality of tempos, respectively.

10. The display apparatus according to claim 1, wherein the processor is further configured to:
based on content data comprising an image signal and the audio signal being received via the receiver, display an image based on the image signal on the display.

11. The display apparatus according to claim 10, wherein the content data further comprises information regarding a position of an object included in the content data, and
wherein the processor is further configured to:
identify an object audio signal generated based on the object among the plurality of audio signals,
identify a color and a brightness corresponding to the object audio signal based on the information regarding the position of the object, and
control a light source among the plurality of light sources that is mapped to a channel of the object audio signal among the plurality of channels, to emit light with the color and the brightness.

12. A method for controlling a display apparatus, the method comprising:
receiving an audio signal having a plurality of channels;
obtaining a plurality of audio signals corresponding to the plurality of channels from the audio signal;
identifying a plurality of colors corresponding to the plurality of audio signals based on a frequency component of each of the plurality of audio signals; and
controlling a plurality of light sources to emit light with the plurality of colors based on information regarding the plurality of light sources mapped to the plurality of channels,
wherein the method further comprises:
identifying a first audio signal among the plurality of audio signals as corresponding to a first channel among the plurality of channels;
identifying a first light source among the plurality of light sources that is mapped to the first audio signal of the first channel; and
controlling the first light source to emit light of a color that has been identified to correspond to the first audio signal, among the plurality of colors.

13. The method according to claim 12, wherein the identifying the plurality of colors further comprises:
inputting the plurality of audio signals to a plurality of filters;
identifying the frequency component of the plurality of audio signals, based on a plurality of signals output from the plurality of filters, respectively; and
identifying the plurality of colors corresponding to the plurality of audio signals, respectively, based on information regarding the plurality of colors mapped to a plurality of frequency components,
wherein the frequency component is one of the plurality of frequency components.

14. The method according to claim 13, wherein the plurality of filters includes a high pass filter for passing a signal having a frequency component higher than a first frequency, among the plurality of frequency components, a low pass filter for passing a signal having a frequency component lower than a second frequency, among the plurality of frequency components, and a band pass filter for passing a signal having a frequency component lower than or equal to the first frequency and higher than or equal to the second frequency, among the plurality of frequency components.

15. The method according to claim 12, wherein the first light source is positioned on a rear surface of a display of the display apparatus, and
wherein the controlling the plurality of light sources further comprises:
identifying a first color among the plurality of colors that corresponds to the first audio signal of a center channel based on a frequency component of the first audio signal among the plurality of audio signals; and
controlling the first light source to emit light with the first color,
wherein the color is the first color, and
wherein the first channel is the center channel.

16. The method according to claim 15, wherein the plurality of light sources further includes a second light source and a fourth light source that are positioned on a lower left portion of the display with respect to a vertical axis through a center of the display, and
a third light source and a fifth light source that are positioned on a lower right portion of the display with respect to the vertical axis, and
wherein the controlling the plurality of light sources further comprises:
identifying a second color among the plurality of colors that corresponds to a second audio signal of a left channel based on a frequency component of the second audio signal among the plurality of audio signals;
controlling the second light source to emit light with the second color;
identifying a third color among the plurality of colors that corresponds a third audio signal of a right channel based on a frequency component of the third audio signal among the plurality of audio signals;
controlling the third light source to emit light with the third color;
identifying a fourth color among the plurality of colors that corresponds to a fourth audio signal of a left surround channel based on a frequency component of the fourth audio signal among the plurality of audio signals;
controlling the fourth light source to emit light with the fourth color;
identifying a fifth color among the plurality of colors that corresponds a fifth audio signal of a right surround channel based on a frequency component of the fifth audio signal among the plurality of audio signals; and
controlling the fifth light source to emit light with the fifth color,
wherein some or all of the first color, the second color, the third color, the fourth color, and the fifth color are the same, or all of the first color, the second color, the third color, the fourth color, and the fifth color are different from one another.

17. The method according to claim 16, wherein the second light source is positioned on a front surface of the lower left portion of the display,
the fourth light source is positioned on a bottom surface of the lower left portion,
the third light source is positioned on a front surface of the lower right portion of the display, and
the fifth light source is positioned on a bottom surface of the lower right portion.

18. The method according to claim 12, wherein
the controlling the plurality of light sources further comprises:
identifying a first color, among the plurality of colors, corresponding to the first audio signal based on a frequency component of the first audio signal;
based on a second audio signal among the plurality of audio signals that corresponds to the first channel being received, identifying a second color, among the plurality of colors, for the second audio signal based on a frequency component of the second audio signal; and
controlling a light source mapped to the first channel among the plurality of light sources to emit light with a third color obtained by combining the first color and the second color,
wherein the color is the first color.

19. The method according to claim 12, wherein the controlling the plurality of light sources further comprises:
identifying magnitudes of amplitudes of the plurality of audio signals, respectively; and
controlling the plurality of light sources to emit light with the plurality of colors and different brightness according to the magnitudes of amplitudes, respectively.

20. The method according to claim 12, wherein the controlling the plurality of light sources further comprises:
identifying a plurality of tempos corresponding to the plurality of audio signals, respectively; and
controlling the plurality of light sources to blink on and off at a plurality of speeds corresponding to the plurality of tempos, respectively.

* * * * *